(12) United States Patent
Taxacher

(10) Patent No.: US 11,407,174 B2
(45) Date of Patent: *Aug. 9, 2022

(54) CANTILEVERED MASK FOR OPENINGS IN ADDITIVELY MANUFACTURED PART

(71) Applicant: General Electric Company, Schenectady, NY (US)

(72) Inventor: Glenn Curtis Taxacher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/837,092

(22) Filed: Apr. 1, 2020

(65) Prior Publication Data

US 2021/0308945 A1 Oct. 7, 2021

(51) Int. Cl.
| | |
|---|---|
| *B29C 64/30* | (2017.01) |
| *B33Y 30/00* | (2015.01) |
| *B33Y 40/00* | (2020.01) |
| *B33Y 80/00* | (2015.01) |
| *B29C 64/286* | (2017.01) |

(52) U.S. Cl.
CPC ............ *B29C 64/286* (2017.08); *B29C 64/30* (2017.08); *B33Y 30/00* (2014.12); *B33Y 40/00* (2014.12); *B33Y 80/00* (2014.12)

(58) Field of Classification Search
CPC ........ B22F 2003/247; B22F 3/24; B22F 5/10; B29C 64/30; B29C 64/40; B33Y 40/00; B33Y 40/10; B33Y 80/00; B05B 12/26
See application file for complete search history.

(56) References Cited

U.S. PATENT DOCUMENTS

| | | | |
|---|---|---|---|
| 2,369,671 A | * | 2/1945 | Greenberg .............. B05B 12/26 220/318 |
| 4,743,462 A | | 5/1988 | Radzavich et al. |
| | | | (Continued) |

FOREIGN PATENT DOCUMENTS

| | | |
|---|---|---|
| CN | 113492527 A | 10/2021 |
| CN | 113492531 A | 10/2021 |
| | (Continued) | |

OTHER PUBLICATIONS

Extended European Search Report from EP Application No. 21163003.3 dated Jul. 23, 2021.

(Continued)

*Primary Examiner* — Philip C Tucker
*Assistant Examiner* — Jimmy R Smith, Jr.
(74) *Attorney, Agent, or Firm* — James Pemrick; Hoffman Warnick LLC

(57) ABSTRACT

A mask is provided for an additively manufactured part including a plurality of openings in a surface of the part. The mask is made with the part and includes an attachment ligament configured to integrally couple to the part adjacent the plurality of openings. A cover member include a proximal end integrally coupled to the attachment ligament and distal end extending at least partially over the plurality of openings. A detachment member may optionally extend from adjacent the cover member. The attachment ligament is the sole connection to the part. The mask may have an L-shape in cross-section.

18 Claims, 13 Drawing Sheets

(56) References Cited

U.S. PATENT DOCUMENTS

| | | | |
|---|---|---|---|
| 5,940,674 A * | 8/1999 | Sachs | B33Y 30/00 419/36 |
| 5,985,122 A | 11/1999 | Conner | |
| 8,661,826 B2 | 3/2014 | Garry et al. | |
| 9,551,058 B2 | 1/2017 | Reid et al. | |
| 9,845,703 B2 | 12/2017 | Baummer et al. | |
| 10,100,668 B2 | 10/2018 | Bromberg et al. | |
| 10,272,461 B2 | 4/2019 | Coskun et al. | |
| 2014/0141174 A1 | 5/2014 | Garry et al. | |
| 2015/0037498 A1 | 2/2015 | Bruck et al. | |
| 2015/0159254 A1 | 6/2015 | Reid et al. | |
| 2016/0089692 A1 | 3/2016 | Reid et al. | |
| 2017/0129013 A1 | 5/2017 | Bunker | |
| 2019/0054568 A1 | 2/2019 | Leary et al. | |
| 2019/0255550 A1 | 8/2019 | Henson et al. | |
| 2019/0337056 A1 * | 11/2019 | El Naga | B22F 10/20 |
| 2021/0047718 A1 | 2/2021 | Dyson et al. | |

FOREIGN PATENT DOCUMENTS

| | | |
|---|---|---|
| EP | 1835045 A1 | 9/2007 |
| EP | 3888821 A | 10/2021 |
| GB | 2461898 B | 9/2010 |

OTHER PUBLICATIONS

Extended European Search Report from EP Application No. 21163000.9 dated Sep. 8, 2021.
Non-Final Office Action from related U.S. Appl. No. 16/837,089 dated Sep. 30, 2021, 17 pages.
Notice of Allowance from related U.S. Appl. No. 16/837,089 dated Feb. 10, 2022, 16 pages.

* cited by examiner

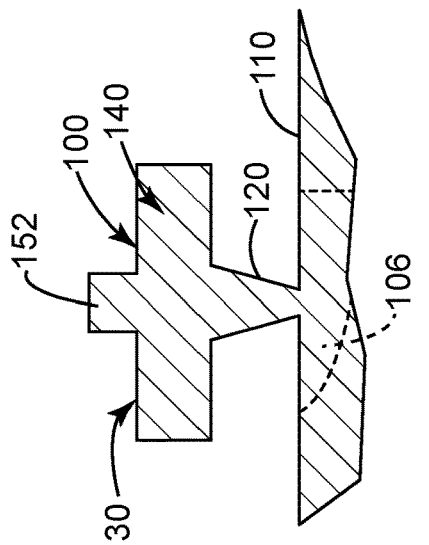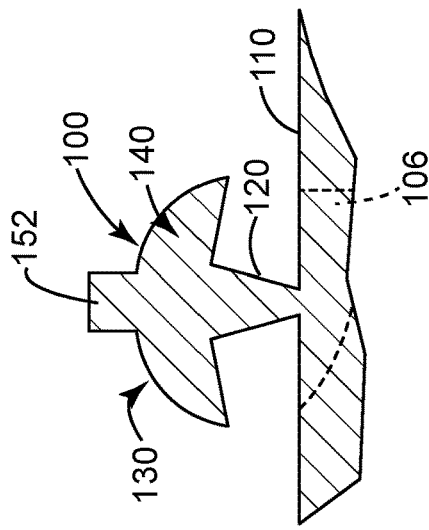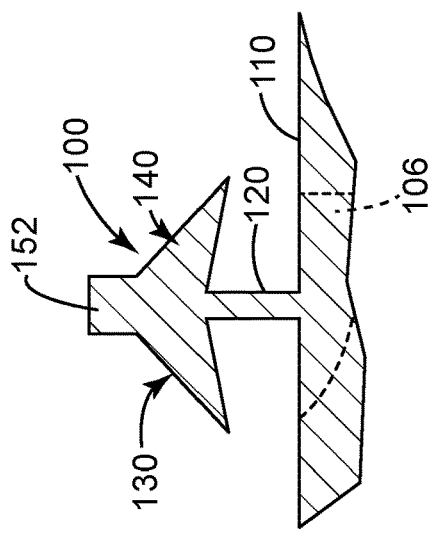

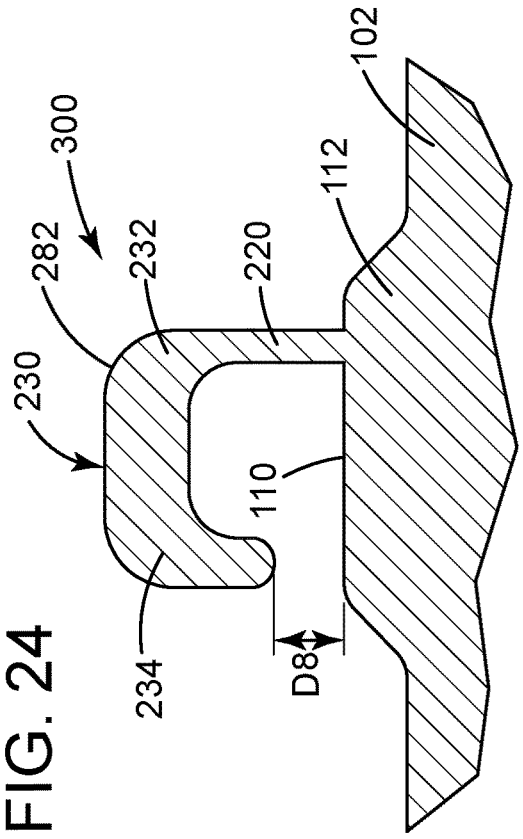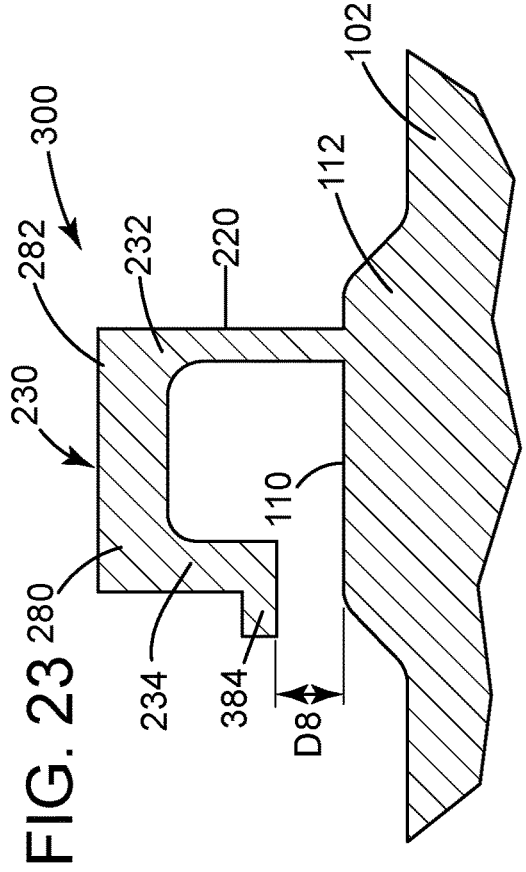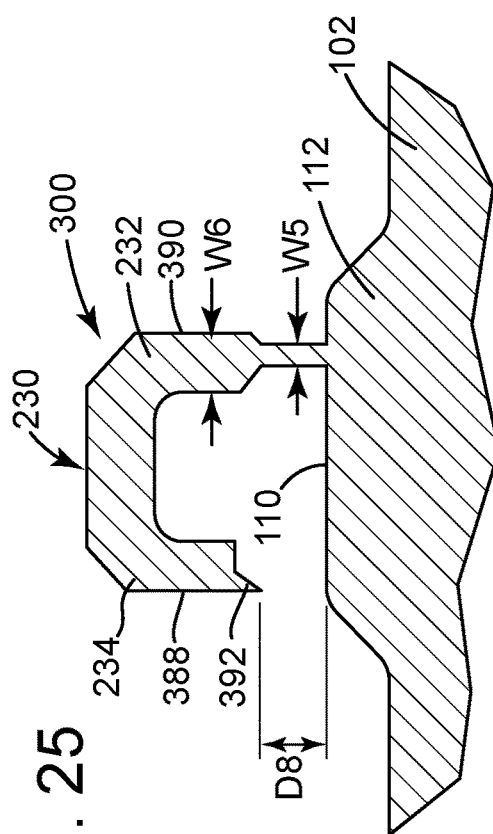

CANTILEVERED MASK FOR OPENINGS IN ADDITIVELY MANUFACTURED PART

BACKGROUND

The disclosure relates generally to post-manufacturing processing of parts and more particularly, to a mask for protecting openings in a surface of an additively manufactured part.

Additive manufacturing (AM) includes a wide variety of processes of producing a part through the successive layering of material rather than the removal of material. As such, additive manufacturing can create complex geometries without the use of any sort of tools, molds or fixtures, and with little or no waste material. Instead of machining parts from solid billets of material, much of which is cut away and discarded, the only material used in additive manufacturing is what is required to shape the component. Accordingly, many industrial parts such as turbine rotor blades are preferably made by additive manufacturing.

Subsequent to formation by additive manufacturing, the parts may be further processed. In one example, the part may be exposed to a shot peening in which the surface of the part is bombarded with a peening material such as metal shot. In another example, the part may be coated with a protective layer to protect the underlying material thereof from the harsh environments in which the part is used. For example, a thermal barrier coating (TBC) may be applied to an outer surface of a turbine rotor blade to protect the blade from high temperatures during use.

Some parts may include openings in a surface thereof that need to be protected during the post-manufacture processing. For example, a turbine rotor blade may include a variety of internal cooling circuits that vent to an outer surface of the part through cooling passages, i.e., openings in the surface of the part. The cooling passages may be provided to cool the internal structure where they are present, and/or create a cooling film across the outer surface of the part.

A variety of mechanisms are employed to protect the openings. In some cases, removable material such as plugs may be provided in or over the openings to, for example, prevent them from being filled as a coating is applied thereover. The removable material blocks the coating from entering the openings, but increases manufacturing time and complexity because the removable material and/or the coating thereof must ultimately be removed. For example, each opening must have the blocking material removed, which can be time consuming. Furthermore, the coating is typically applied over the blocking material, but needs to be removed from over the blocking material to expose the blocking material and/or the openings. Because the coating bridges over the blocking material, removal of the coating can cause extensive cracking in the rest of the coating, e.g., a TBC, that may render the part unusable or require extensive additional processing. Removal of blocking material after a peening process can be especially challenging where the blocking material is seized with the part's material by the process. Other approaches employ permanent shielding features to protect the openings. In this latter case, the complexity of the part is increased, and the performance of the part may be sacrificed to accommodate the shielding.

BRIEF DESCRIPTION

A first aspect of the disclosure provides a mask for an additively manufactured part including a plurality of openings spaced in a surface of the part, the mask comprising: an attachment ligament configured to integrally couple to the part between the plurality of openings in a cantilever fashion; a first cover member including a first proximal end integrally coupled to the attachment ligament and a first distal end extending at least partially over a first portion of the plurality of openings, the first distal end of the first cover member separated from the part by a first spacing; a second cover member including a second proximal end integrally coupled to the attachment ligament and a second distal end extending at least partially over a second portion of the plurality of openings, the second distal end of the second cover member separated from the part by a second spacing; and a detachment member extending from adjacent the first and second cover members, wherein the attachment ligament is the sole connection to the part.

A second aspect of the disclosure provides an additively manufactured (AM) structure, comprising: a part including a plurality of openings spaced in a surface of the part; and a mask including: an attachment ligament configured to integrally couple to the part between the first plurality of openings and the second plurality of openings in a cantilever fashion; a first cover member including a first proximal end integrally coupled to the attachment ligament and a first distal end extending at least partially over a first portion of the plurality of openings, the first distal end of the first cover member separated from the part by a first spacing; a second cover member including a second proximal end integrally coupled to the attachment ligament and a second distal end extending at least partially over a second portion of the plurality of openings, the second distal end of the second cover member separated from the part by a second spacing; and a detachment member extending from adjacent the first and second cover members, wherein the attachment ligament is the sole connection to the part, and wherein the part, the attachment ligament, the first and second cover members and the detachment member include a plurality of integral material layers.

A third aspect of the disclosure provides a mask for an additively manufactured part, the part including a plurality of openings in a surface thereof, the mask comprising: an attachment ligament configured to integrally couple to the part adjacent to the first plurality of openings in a cantilever fashion; and a cover member including a proximal end integrally coupled to the attachment ligament and a distal end extending at least partially over the plurality of openings, the distal end of the cover member separated from the part by a first spacing, wherein the attachment ligament is the sole connection to the part.

A fourth aspect of the disclosure includes an additively manufactured (AM) structure, comprising: a part including a plurality of openings in a surface thereof; a mask including: an attachment ligament configured to integrally couple to the part adjacent to the first plurality of openings in a cantilever fashion; a cover member including a proximal end integrally coupled to the attachment ligament and a distal end extending at least partially over the plurality of openings, the distal end of the cover member separated from the part by a first spacing; and a detachment member extending from the cover member, wherein the attachment ligament is the sole connection to the part, and wherein the part, the attachment ligament, the cover member and the detachment member include a plurality of integral material layers.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 10 shows a cross-sectional view of a mask according to an alternative embodiment of the disclosure.

FIG. 11 shows a cross-sectional view of a mask according to yet another alternative embodiment of the disclosure.

FIG. 12 shows a cross-sectional view of a mask according to another embodiment of the disclosure.

FIG. 23 shows a cross-sectional view of a mask including alternative features, according to embodiments of the disclosure.

FIG. 24 shows a cross-sectional view of a mask including alternative features, according to embodiments of the disclosure.

FIG. 25 shows a cross-sectional view of a mask including alternative features, according to embodiments of the disclosure.

Figure 1:
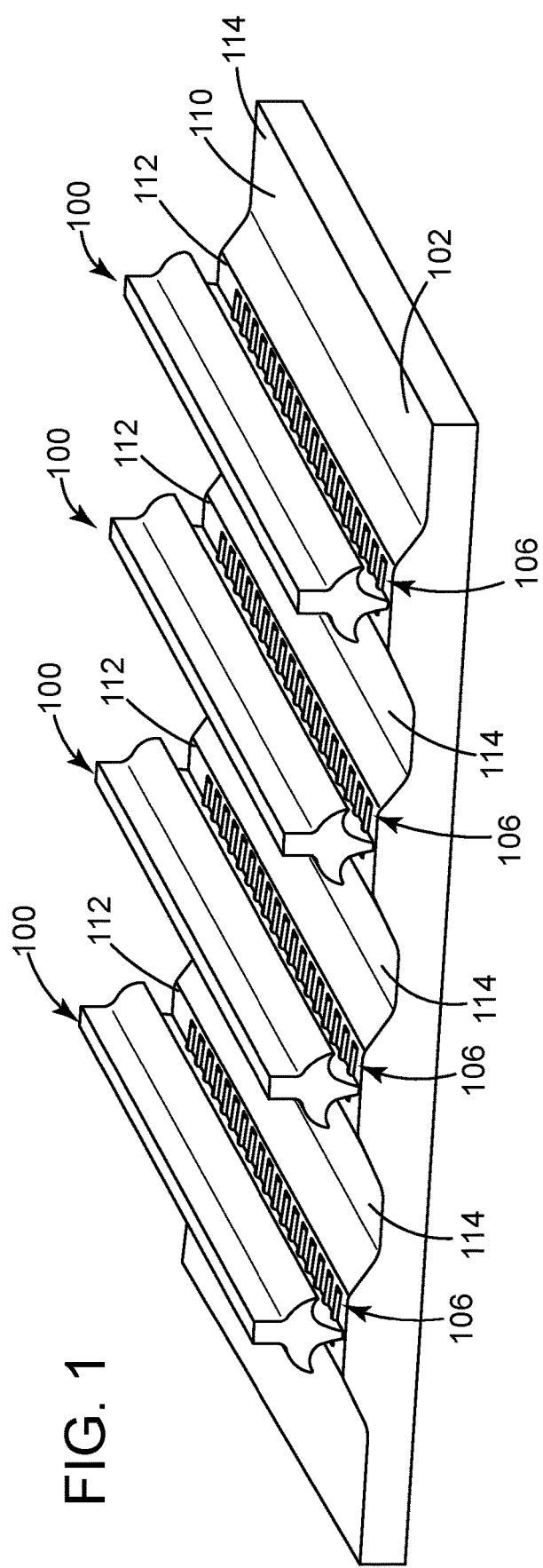
FIG. 1 shows a perspective view of a number of masks for an additively manufactured part, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant machine components. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

It is often required to describe parts that are disposed at differing linear positions with regard to a position. The term "distal" refers to a locale or part of a thing that is more distant than the "proximal" locale or part of the same thing. For example, a distal end of a thing is farther away from a proximal end of the same thing. The terms thus provide general positioning relative to one another. In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a mask for an additively manufactured part including a first plurality of openings and a second, spaced plurality of openings in a surface of the part. The mask is made with the part, and may include an attachment ligament configured to integrally couple to the part between the first plurality of openings and the second plurality of openings in a cantilever fashion. The mask is removable from the part by breaking of the attachment ligament. In one embodiment, first and second cover members include proximal ends integrally coupled to the attachment ligament and distal ends extending at least partially over a respective pluralities of openings. In another embodiment, a single cover member is integrally coupled to the attachment ligament and extends at least partially over a plurality of openings. A detachment member may be provided to certain embodiments to allow easy removal of the mask from the part. In any event, the attachment ligament is the sole connection to the part. The mask may be generally umbrella shaped or L-shaped in cross-section.

Figure 2:
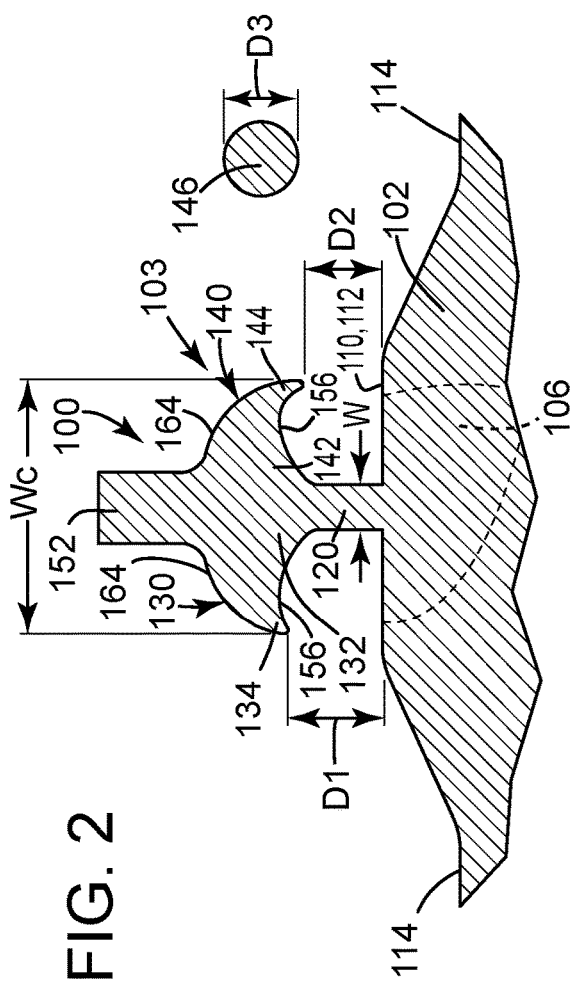
FIG. 2 shows an enlarged cross-sectional view of a mask, according to embodiments of the disclosure.

Referring to FIGS. 1-12, a mask 100 for an additively manufactured part 102 according to certain embodiments of the disclosure is illustrated. FIG. 1 shows a perspective view of mask 100 for additively manufactured part 102 (hereinafter "part 102") according to certain embodiments of the disclosure. Mask 100 and part 102 may be formed using any appropriate additive manufacturing technique for the part material, and collectively may constitute an additive manufacture (AM) structure 103 (FIG. 2 only). Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component, e.g., part 102 and mask 100, to be formed, electronically slicing the component into layers, e.g., 18-102 micrometers thick, and creating a file with a two-dimensional image of each layer, including vectors, images or coordinates. The file may then be loaded into a preparation software system that interprets the file such that the component, e.g., mask 100 and part 102, can be built by different types of additive manufacturing systems. In 3D printing, rapid prototyping (RP), and direct digital manufacturing (DDM) forms of additive manufacturing, material layers, e.g., plastics or ceramics, are selectively dispensed to create the component, e.g., by laying the material layer after layer. In contrast, in metal powder additive manufacturing techniques, such as direct metal laser melting (DMLM) (also referred to as selective laser melting (SLM)), metal powder layers are sequentially melted together to form the part. More specifically, fine metal powder layers are sequentially melted after being uniformly distributed using an applicator on a metal powder bed. Each applicator includes an applicator element in the form of a lip, brush, blade or roller made of metal, plastic, material, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two dimensional layer, and the process repeats until the component is completely formed. In one non-limiting example, mask 100 and part 102 may be formed by DMLM or SLM for a metal part, or 3D printing for a ceramic part.

In the FIG. 1 embodiment, part 102 includes a plurality of openings 106 in a surface 110 of part 102. Plurality of openings 106 may include any number of openings grouped generally in a line. Part 102 may include any now known or later developed industrial part. In one non-limiting example, part 102 may include a turbine rotor blade that includes a variety of internal cooling circuits that vent to an outer surface, e.g., surface 110, of the part through cooling passages. The cooling passages may be provided to cool the internal structure where they are present, and/or create a cooling film across surface 110 of part 102. Although not necessary in all instances, as shown in the FIG. 1 example, openings 106 may be positioned in a pedestal 112 in surface 110 of the part extending from another surface 114 of the part.

Openings 106 may have any cross-sectional shape at surface 110, e.g., circular, oval, polygonal (square, rectangular, trapezoidal, etc.), diffuser shaped, etc., and may extend in any direction relative to surface 110 into part 102. Plurality of openings 106 are positioned in surface 110 of part 102 across a distance, e.g., in a line. Plurality of openings 106 may be positioned across surface 110 in a spaced manner, e.g., equidistant or not equidistant. Four sets of openings 106 are shown in FIG. 1, each with an associated mask 100. Any number of masks 100 may be employed, e.g., less than four or more than four.

FIG. 2 shows an enlarged cross-sectional view of a mask 100 of FIG. 1 according to certain embodiments of the disclosure. Mask 100 includes an attachment ligament 120 configured to integrally couple to part 102 between selected openings 106 in a cantilever fashion, i.e., it is a projecting member coupled at only one end thereof to part 102. Attachment ligament 120 is the sole connection to part 102. As will be described, attachment ligament 120 couples mask 100 to part 102 in a manner that allows easy removal of mask 100 from part 102. It is noted that due to the limitations of certain additive manufacturing techniques, mask 100 and part 102 may not be necessarily formed in the same orientation as illustrated.

Mask 100 also includes: a first cover member 130 including a first proximal end 132 integrally coupled to attachment ligament 120 and a first distal end 134 extending at least partially over a first portion of plurality of openings 106, and a second cover member 140 including a second proximal end 142 integrally coupled to attachment ligament 120 and a second distal end 144 extending at least partially over a second portion of plurality of openings 106. First and second cover members 130, 140 extend at least partially over plurality of openings 106, respectively, along an entirety of the distance openings extend. That is, all openings 106 are at least partially covered by a respective cover member 130, 140. "At least partially covered" indicates that some exposure of openings 106 is allowed. For example, first distal end 134 of first cover member 130 is separated from part 102 by a first spacing D1, and second distal end 144 of second cover member 140 is separated from part 102 by a second spacing D2. Hence, some spacing D1, D2 that exposes openings 106 is provided by cover members 130, 140.

Figure 3:
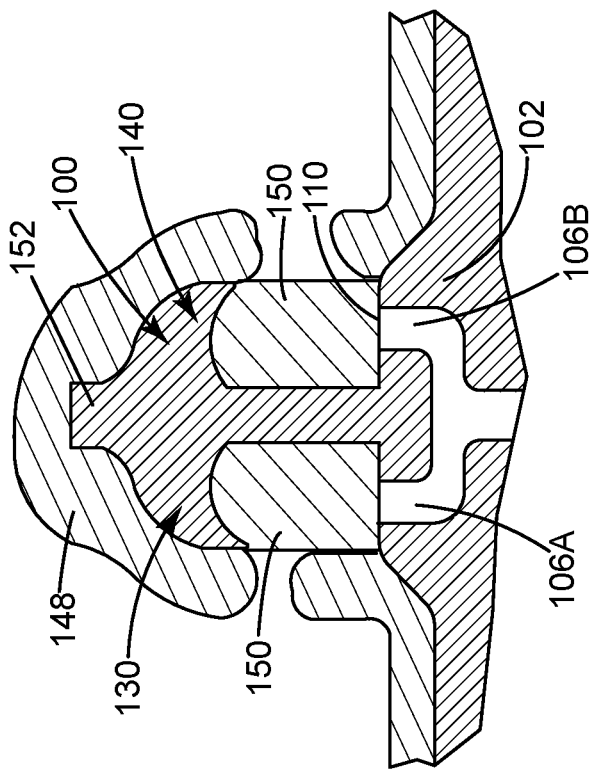
FIG. 3 shows an enlarged cross-sectional view of a mask with a coating thereon, according to embodiments of the disclosure.

Spacings D1, D2 provide a number of advantages. In certain embodiments, as shown in FIG. 2, first and second spacing D1, D2 have a dimension configured to prevent a peening material 146, e.g., metal shot, ice, pellets, sand, etc., from passing therethrough. In this case, a diameter D3 of peening material 146 may be ascertained, and spacings D1, D2 sized to be sufficiently smaller than diameter D3 to prevent peening material 146 from entering spacings D1, D2. In this manner, cover members 130, 140 can prevent damage to openings 106 that may otherwise occur from impact by peening material 146. In certain embodiments, as shown in FIG. 3, first and second spacing D1, D2 have a dimension configured to prevent a coating 148 applied over respective cover member 130, 140 from bridging from respective cover member 130, 140 to part 102. That is, a gap 149 exists in coating 148. Spacings D1, D2 may be sized based on, for example, coating 148 material, application format, expected thickness, among other factors. As illustrated, while coating 148 coats part 102 and mask 100, it fails to enter spacings D1, D2 and thus does not coat or fill openings 106. Further, coating 148 fails to connect across spacings D1, D2, leaving gap 149. In this manner, when mask 100 is removed, coating 148 does not require breaking to remove the mask, which could cause cracking where coating 148 extends over part 102. That is, there is no force applied to coating 148 on part 102, and thus there is no possibility of cracking of coating 148 on part 102. While the dimensions of spacings D1, D2 may vary depending on peening material 146 and/or coating 148, in one non-limiting example, first and second spacing D1, D2 may each be between 0.88 millimeters (mm) to 1.4 mm (0.035 to 0.055 inches). This range of dimensions would, for example, prevent coating 148 having a thickness between 1.40 mm and 1.52 mm from bridging from cover members 130, 140 to part 102, and would prevent 1.5 mm metal shot from lodging in spacings D1, D2 and impacting openings 106. Other dimensions are possible.

Figure 4:
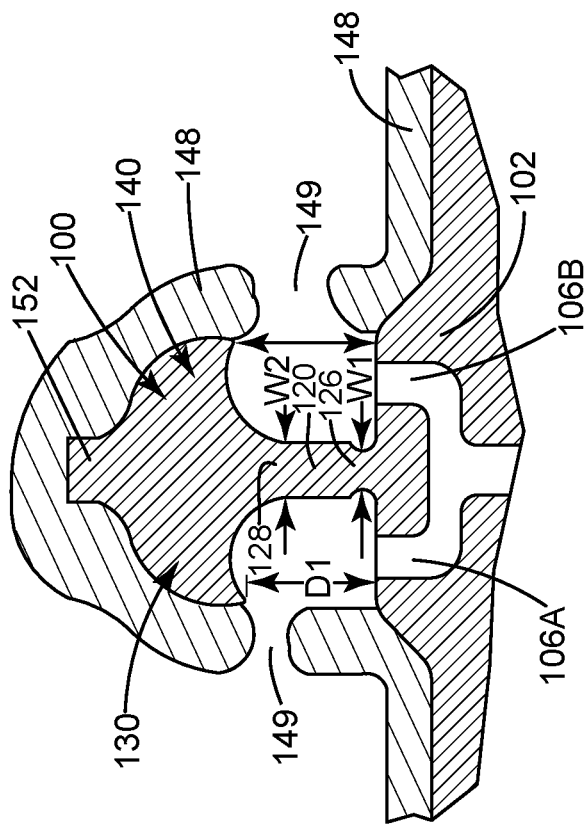
FIG. 4 shows an enlarged cross-sectional view of a mask with a coating and a space filling material, according to embodiments of the disclosure.

As shown in FIG. 4, in certain embodiments, a space filling material 150 may be positioned between at least one of first and second cover members 130, 140 and surface 110. Space filling material 150 may at least partially fill a space under cover member(s) 130, 140, and spacings D1, D2. Space filling material 150 may include any material capable of filling the space without unnecessarily filling too much of openings 106, and should be easily removable. Space filling material 150 may include but is not limited to filaments including a water soluble polymers or other eutectic salts.

Figure 7:
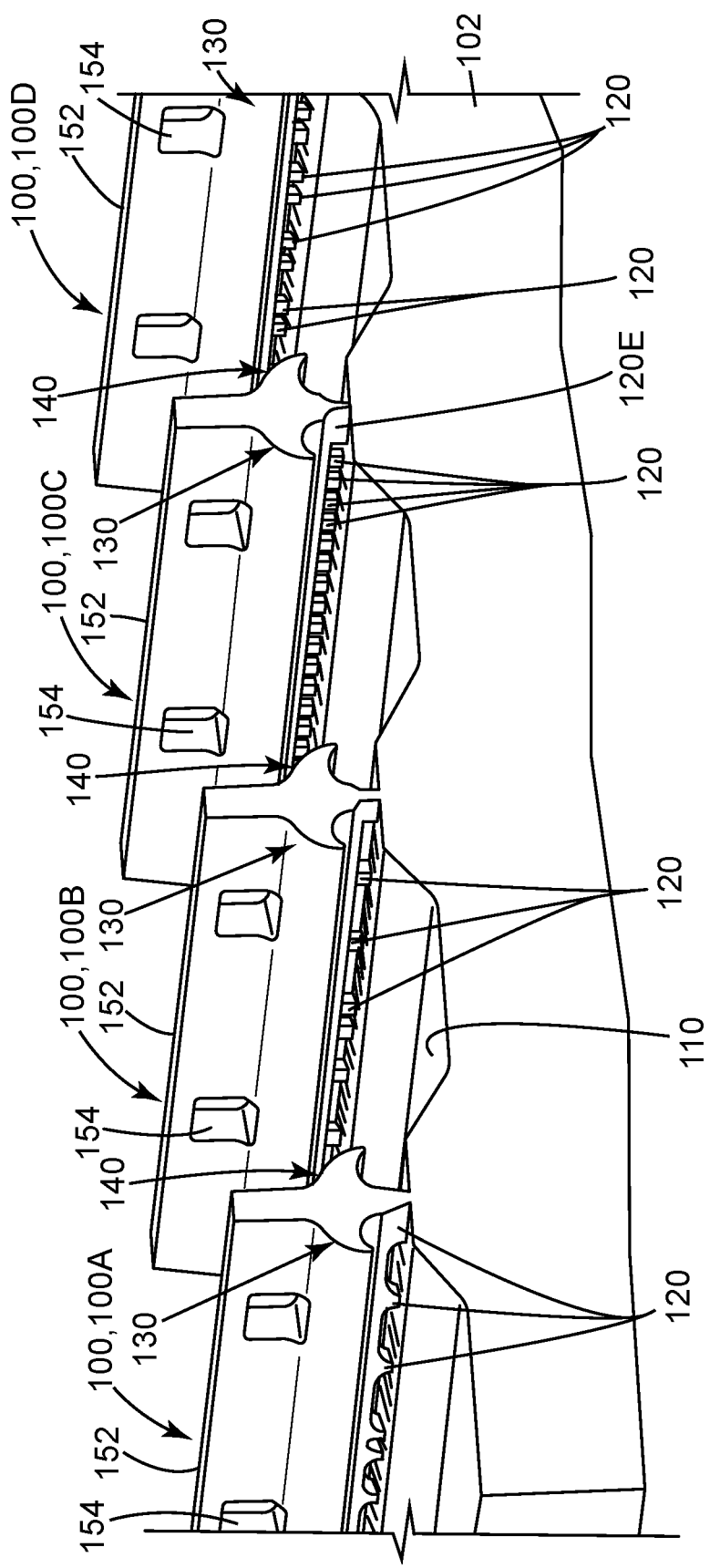
FIG. 7 shows a perspective view of a number of masks illustrating variations of attachment ligaments, according to embodiments of the disclosure.

Mask 100 may also include detachment member 152 extending from adjacent first and second cover members 130, 140. Detachment member 152 may include any structure capable of being engaged and manipulated to remove mask 100 from part 102 by breaking attachment ligament 120. Detachment member 152 may include, for example, a squared off end capable of grasping by a tool (not shown), e.g., channel lock pliers, adjustable wrench, etc. In addition thereto, or alternatively, as shown in FIG. 7, detachment member 152 may include a tool receiving feature 154 therein configured to receive a tool (not shown) such as but not limited to a pry bar, screwdriver, channel lock pliers, adjustable wrench. Tool receiving feature 154 may have any shape and/or size to prevent coating 148 (FIG. 3) from filling it. In any event, detachment member 152 is capable of manipulation using the tool or manually to apply a force that break attachment ligament 120, thus allowing removal of mask 100. Detachment member 152 may have any desired vertical height from cover members 130, 140.

Figure 5:
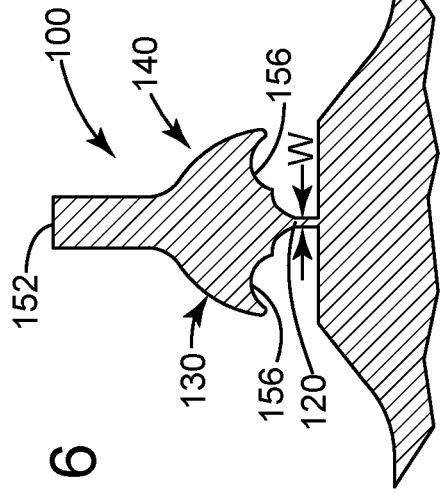
FIG. 5 shows an enlarged cross-sectional view of a mask with an alternative version of an attachment ligament, according to embodiments of the disclosure.
Figure 6:
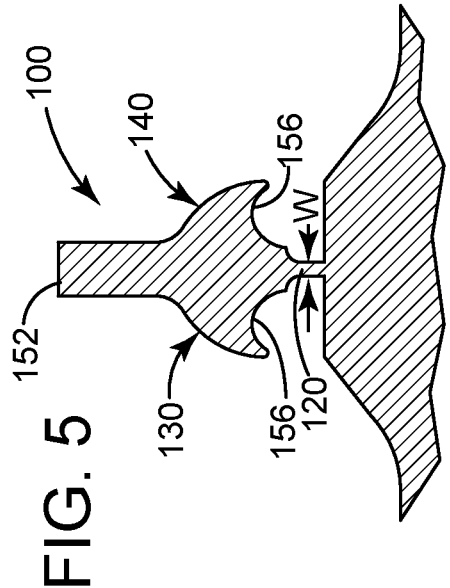
FIG. 6 shows an enlarged cross-sectional view of a mask with another alternative version of an attachment ligament, according to embodiments of the disclosure.

With further regard to attachment ligament 120, as shown in FIGS. 2 and 3, attachment ligament 120 has a minimum width W that allows for its easy detachment, and thus mask 100 detachment, from part 102. FIG. 2 shows an attachment ligament 120 that meets at substantially perpendicular angle with part 102. In FIG. 2, the width W is generally uniform; however, this is not necessary in all cases as it may be advantageous for attachment ligament(s) 120 to taper or narrow to foster breaking. For example, FIG. 3 shows an attachment ligament 120 having a lower portion 126 integrally coupled to part 102 and having a first (minimum) width W1, and an upper portion 128 above lower portion 126 and having a second width W2 that is wider than first width W1. The smaller width W1 makes it easier to break attachment ligament 120, and leave less remnants thereof on part 102 that require removal by machining. FIGS. 5 and 6 show enlarged cross-sectional views of attachment ligaments 120 having varying width according to other embodiments. FIGS. 5 and 6 show cover members 130, 140 may have a lower surface 156 thereof shaped in any manner desired to create the desired minimum width W of attachment ligament(s) 120. In one non-limiting example, attachment ligament(s) 120 may have a minimum width W ranging from 0.01 millimeters (mm) to 0.50 mm (0.01 to 0.02 inches). The minimum width W can vary depending on a large number of factors including but not limited to: part and mask material, size of part 102, size of openings 106, desired force to remove, expected tools to be used, an anticipated collective width Wc (FIG. 2) of cover members 130, 140, etc. Incidentally, collective width Wc of cover members 130, 140 may be in one non-limiting example 3.81 mm to 4.32 mm (0.15 to 0.17 inches).

Attachment ligament(s) 120 may also take a variety of structural forms. While shown as generally perpendicular to part 102, some non-perpendicular angling may be employed. In certain embodiments, as shown in FIG. 1, attachment ligament 120 may extend an entire length of mask 100 that includes a single length of cover members 130, 140. Alternatively, as shown in various forms in FIG. 7, attachment ligaments 120 may integrally couple to part 102 at spaced connection points along the distance covered by cover members 130, 140. Any configuration of spaced attachment ligaments 120 may be employed. In the non-limiting examples in FIG. 7: mask 100A has attachment ligaments 120 generally randomly spaced with varying lengths; mask 100B also has attachment ligaments 120 generally randomly spaced with varying lengths but differently spaced than mask 100A; mask 100C has attachment ligaments 120 equidistantly spaced with uniform lengths excepting an end attachment ligament 120E; and mask 100D has pairs of attachment ligaments 120 equidistantly spaced with uniform lengths. In certain embodiments, attachment ligament 120 integrally couples to part 102 along between 25% and 60% of the distance covered by cover members 130, 140. In a further embodiment, attachment ligament 120 integrally couples to part 102 along between 25% and 35% of the distance covered by cover members 130, 140. Any desired attachment ligament 120 spacing and lengths can be employed to attain the desired detachment action, e.g., desired force, tool, etc., and desired attachment ligament 120 remnant on part 120 after mask 100 removal. Any remnants of attachment ligament(s) 120 may be removed through machining, e.g., grinding.

Figure 8:
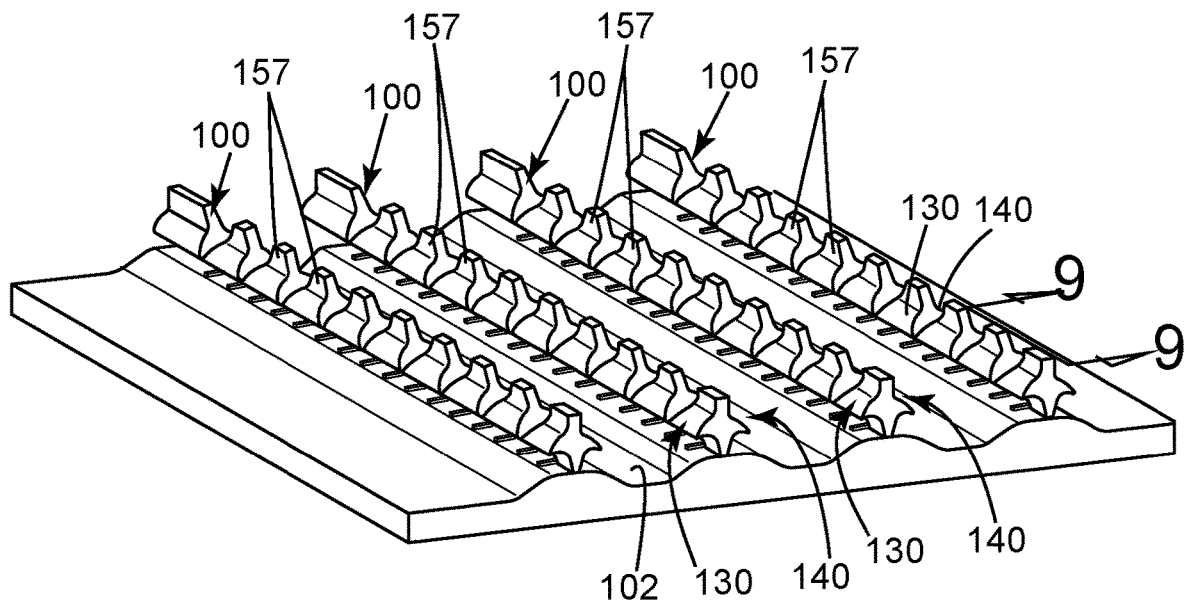
FIG. 8 shows a perspective view of a number of masks illustrating segmented cover members and detachment members, according to embodiments of the disclosure.
Figure 9:
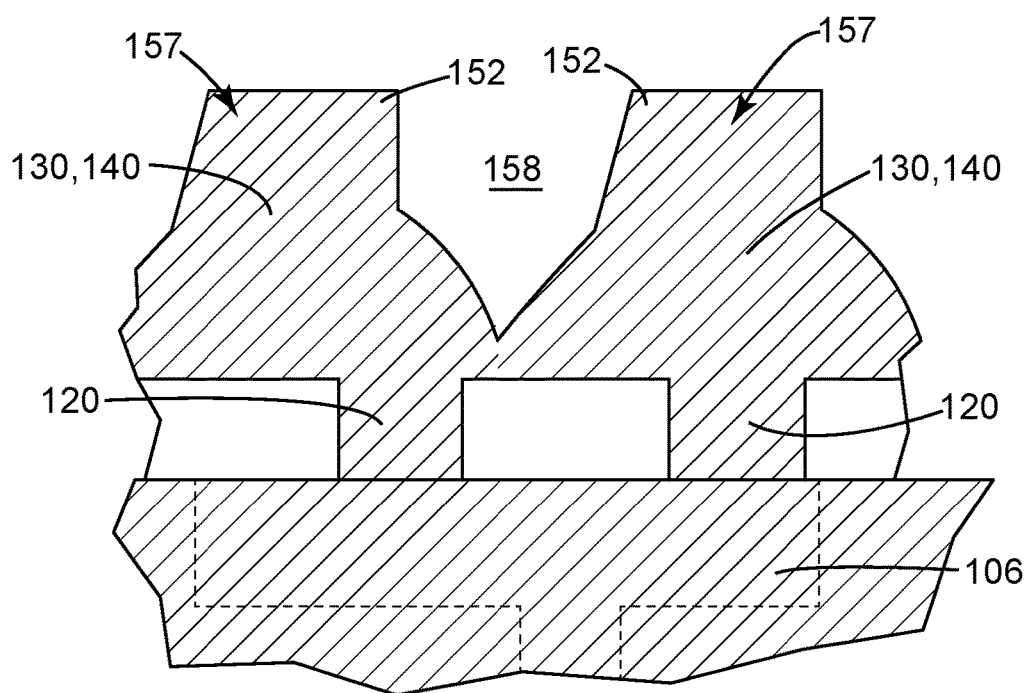
FIG. 9 shows a cross-sectional view along line 9-9 in FIG. 8.

Referring to FIGS. 8 and 9, in other embodiments, first and second cover members 130, 140 and detachment member 152 may be segmented into a plurality of cover member and detachment member segments 156 along the distance covered by cover members 130, 140. Here, a gap 158 (FIG. 9) may be formed in cover members 130, 140 and detachment member 152 along a length of mask 100. As shown in FIG. 9, taken along the cross-sectional view along line 9-9 in FIG. 8, segments 156 may be connected at lower ends of adjacent cover members 130, 140 so as to maintain support for mask 100. Each of the plurality of cover member and detachment member segments 156 are individually separable from part 102 by breaking a respective portion of attachment ligament(s) 120. The segmentation allows easier and selective removal of segments of mask 100.

Returning to FIG. 2, cover members 130, 140 have been illustrated as having a convex outer surface 164 facing away from part 102, and a concave inner (lower) surface 156 facing part 102. In this case, cover members 130, 140 with detachment member 152 may have a mushroom-shaped cross-section. As illustrated in FIGS. 1-9, in these embodiments, mask 100 has a somewhat umbrella shaped cross-section. However, cover members 130, 140 may have any shape desired to protect openings 106 in the manner described herein that is capable of additive manufacture with part 102. FIGS. 10-12 show cross-sectional views of a number of non-comprehensive examples of alternative shapes. FIG. 10 shows a more fir-tree shaped mask, FIG. 11 shows a more drooped umbrella or mushroom shaped mask, and FIG. 12 shows a more cross-like shaped mask. Other shapes may also be possible, and are considered within the scope of the disclosure. Outer surfaces of mask 100, e.g., surfaces 164 (FIG. 2) or that of detachment member 152, may be configured to couple with coating 148 (FIG. 3) in a manner different than part 102, e.g., with a rougher surface for better hold. While the figures show the cover members 130, 140 with the same shaped cover member on each side of attachment ligament 120, i.e., as symmetrical, the different shaped cover members illustrated herein may be used in an asymmetrical manner, e.g., with cover member 130 from FIG. 2 used with cover member 140 from FIG. 12. Any combination of differently shaped cover members 130, 140 illustrated herein can be employed in an asymmetrical manner.

Mask 100 may be made of the same material as part 102. Consequently, the material may depend on the part's application. In one embodiment, mask 100 and part 102 may be made of a metal which may include a pure metal or an alloy. For example, where part 102 is a turbine blade, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). Alternatively, part 102 and mask 100 may be made of, for example, a plastic or a ceramic. As noted, mask 100 and part 102 may be made of additive manufacturing (e.g., DMLM, SLM, 3D printing, etc.) technique that will vary depending on the material. In any case, part 102, attachment ligament(s) 120, first and second cover members 130, 140 and detachment member 152 will include a plurality of integral material layers, created by the additive manufacturing.

Figure 13:
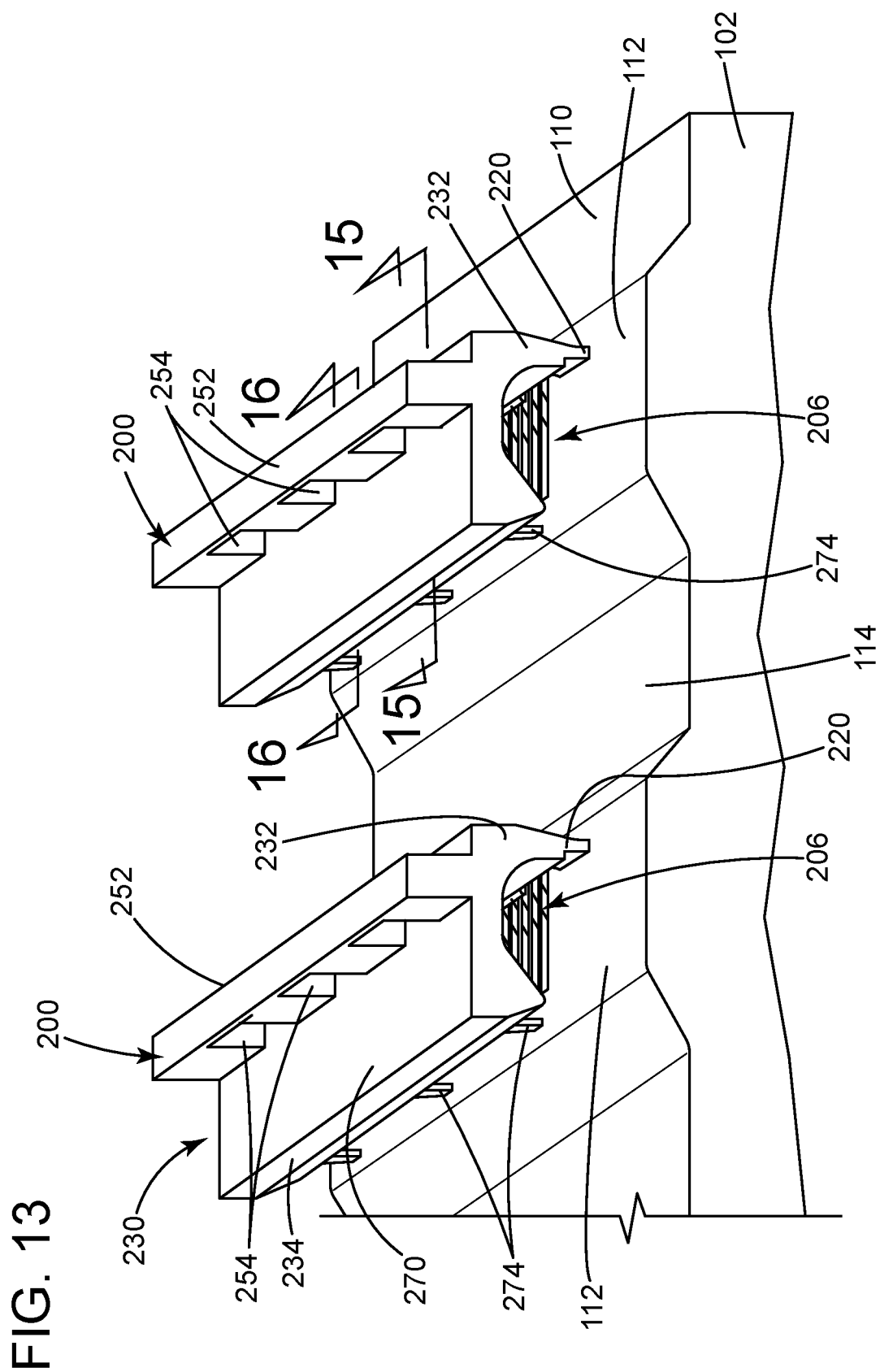
FIG. 13 shows a perspective view of a number of masks for an additively manufactured part, according to embodiments of the disclosure.
Figure 14:
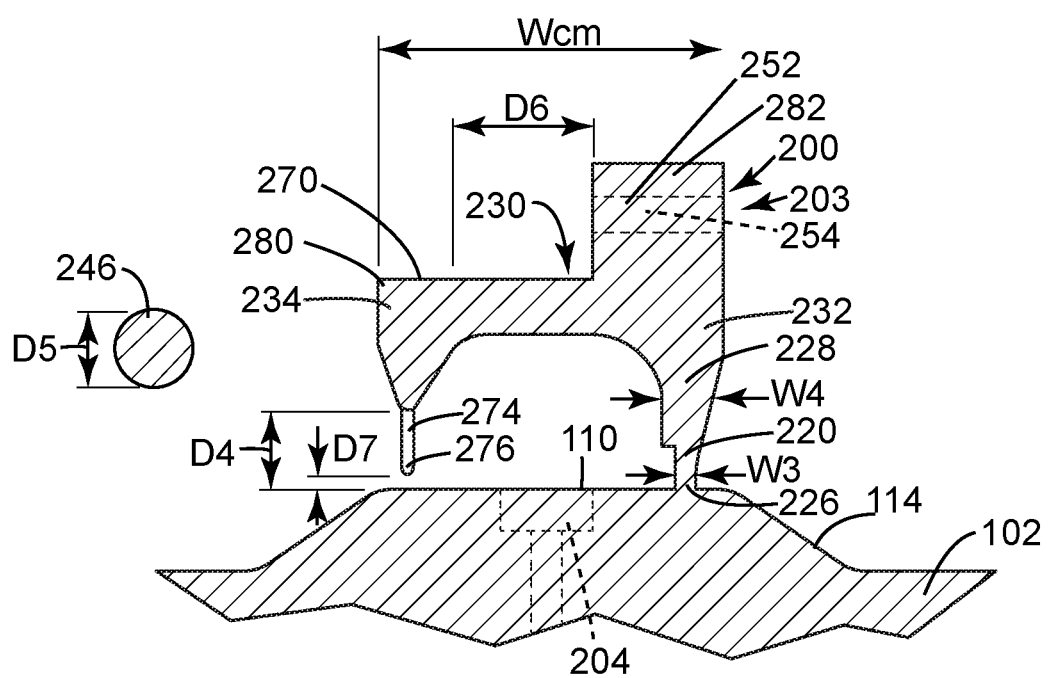
FIG. 14 shows an enlarged cross-sectional view of a mask of FIG. 13 in a relaxed position, according to embodiments of the disclosure.

Referring to FIGS. 13-18, a mask 200 for an additively manufactured part 102 according to another embodiment of the disclosure is illustrated. Mask 200 and part 102 may be formed using any appropriate additive manufacturing technique for the part material, and collectively may constitute an AM structure 203 (FIG. 14 only). In this embodiment, part 102 may include a (single) plurality of openings 204 in surface 110 thereof. That is, although multiple openings may be covered by mask 200, only a single grouping of openings 204 in a single line is provided in this embodiment. Part 102 may include any now known or later developed industrial part. In one non-limiting example, part 102 may include a turbine rotor blade that includes a variety of internal cooling circuits that vent to an outer surface, e.g., surface 110, of the part through cooling passages. The cooling passages may be provided to cool the internal structure where they are present, and/or create a cooling film across surface 110 of part 102. Although not necessary in all instances, as shown in the FIG. 13 example, openings 204 may be positioned in pedestal 112 in surface 110 of the part extending from another surface 114 of the part. Openings 204 may have any cross-sectional shape at surface 110, e.g., circular, oval, polygonal (square, rectangular, trapezoidal, etc.), diffuser shaped, etc., and may extend in any direction relative to surface 110 into part 102. Plurality of openings 204 are positioned in surface 110 of part 102 across a distance, e.g., generally in a line. Openings 204 may be positioned across surface 110 in a spaced manner, e.g., equidistant or not equidistant. While two masks 200 are shown in FIG. 13, any number of masks 200 may be employed, e.g., less than two or more than two.

Figure 15:
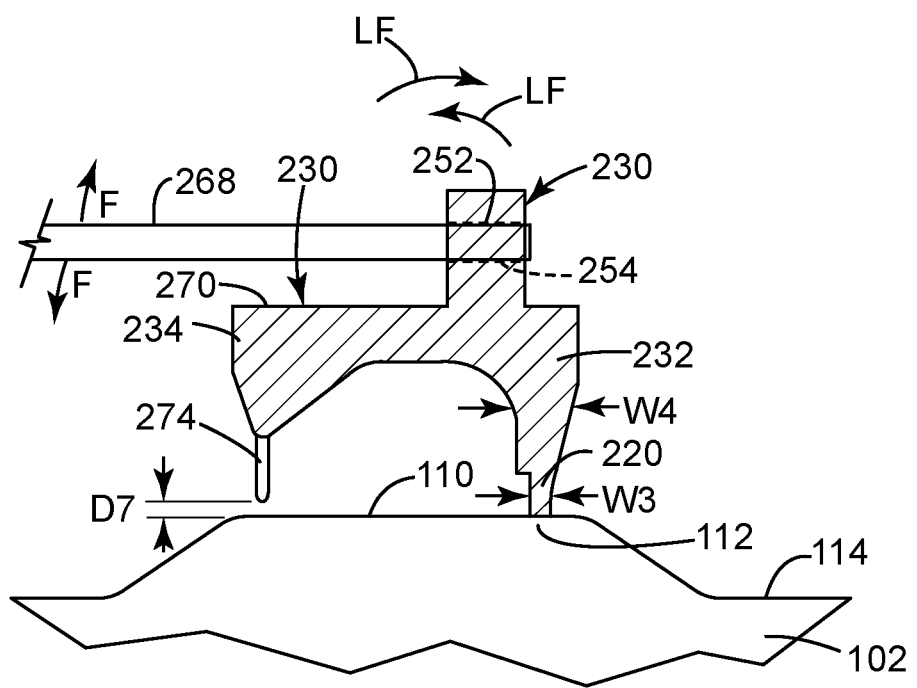
FIG. 15 shows an enlarged cross-sectional view of a mask with a tool thereon, according to embodiments of the disclosure.

FIGS. 14 and 15 show enlarged cross-sectional views of mask 200 according to certain embodiments of the disclosure. FIG. 14 is along line 15-15 in FIG. 13, and FIG. 15 is along line 16-16 in FIG. 13. Mask 200 includes an attachment ligament 220 configured to integrally couple to part 102 adjacent plurality of openings 204 in a cantilever fashion, i.e., it is a projecting member coupled at only one end thereof to part 102. Attachment ligament 220 is the sole, full time connection to part 102. As will be described, attachment ligament 220 couples mask 200 to part 102 in a manner that allows easy removal of mask 200 from part 202.

Mask 200 also includes a cover member 230 including a proximal end 232 integrally coupled to attachment ligament 220 and a distal end 234 extending at least partially over plurality of openings 204. Distal end 234 may have any cross-sectional shape, e.g., generally triangular as illustrated. Cover member 230 extends at least partially over plurality of openings 204 along an entirety of the distance they extend. That is, all openings 204 are at least partially covered by cover member 230. Cover member 230 and attachment ligament 220 provide mask 200 with a somewhat L-shaped or a 7-shaped cross-section.

Figure 16:
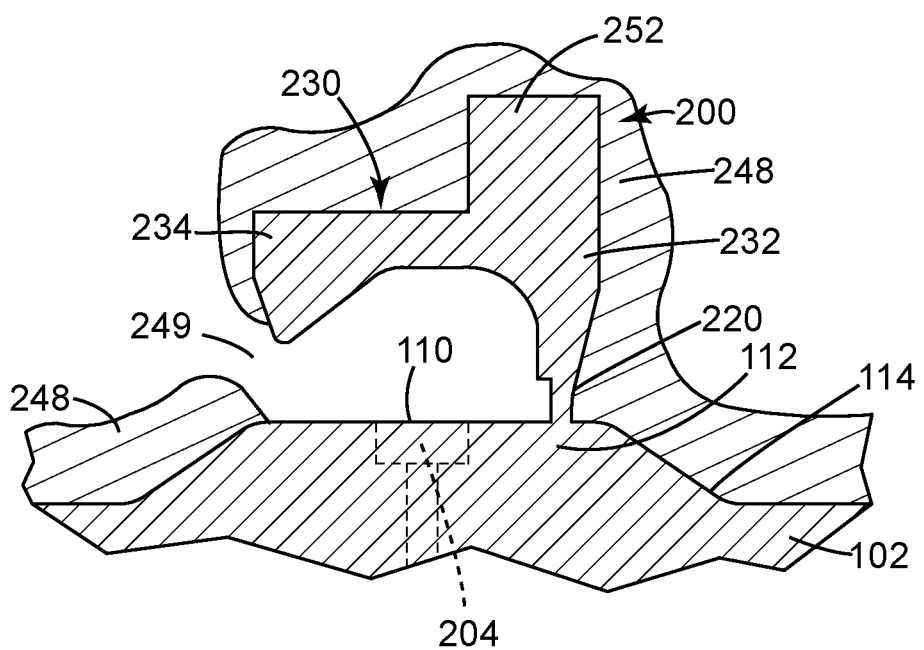
FIG. 16 shows an enlarged cross-sectional view of a mask with a coating thereon, according to embodiments of the disclosure.

As noted previously, "at least partially covered" indicates that some exposure of openings 204 is allowed. For example, as shown in FIG. 14, distal end 234 of cover member 230 is separated from part 102 by a spacing D4. Hence, some spacing D4 that exposes openings 204 is provided by cover member 230. Spacing D4, similar to spacings D1, D2 in previous figures, provides a number of advantages. In certain embodiments, as shown in FIG. 14, spacing D4 has a dimension configured to prevent a peening material 246, e.g., metal shot, ice, pellets, sand, etc., from passing therethrough. In this case, a diameter D5 of peening material 246 may be ascertained, and spacing D4 sized to be sufficiently smaller than diameter D5 to prevent peening material 246 from entering spacing D4. In this manner, cover member 230 can prevent damage to openings 204 that may otherwise occur from impact by peening material 246. In certain embodiments, as shown in FIG. 16, spacing D4 has a dimension configured to prevent a coating 248 applied over cover member 230 from bridging from cover member 230 to part 102 at distal end 234. Spacing D4 may be sized based on, for example, coating 248 material, application format, expected thickness, among other factors. As illustrated, while coating 248 coats part 102 and mask 200, it fails to enter spacing D4 and thus does not coat or fill openings 204. Cover member 230 prevents coating 248 from reaching openings 204, leaving gap 249. Further, coating 248 fails to connect across spacing D4. In this manner, when mask 200 is removed, coating 248 on part 102 is not impacted. There is no force applied to coating 248 on part 102, and thus there is no possibility of cracking of coating 248 on part 102. While the dimensions of spacing D4 may vary depending on peening material 246 and/or coating 248, in one non-limiting example, spacing D4 may be between 0.88 millimeters (mm) to 1.4 mm (0.035 to 0.055 inches). This range of dimensions would prevent, for example, coating 248 having a thickness between 1.40 mm and 1.52 mm from bridging from cover member 230 to part 102, and would prevent 1.5 mm metal shot from lodging in spacing D4 and impacting openings 204. Other dimensions may also be possible.

Mask 200 may also include detachment member 252 extending from cover members 230. Detachment member 252 may include any structure capable of being engaged and manipulated to remove mask 200 from part 102 by breaking attachment ligament. Detachment member 252 may include, for example, a squared off end capable of grasping by a tool (not shown), e.g., channel lock pliers, adjustable wrench, etc. In addition thereto, or alternatively, as shown in FIG. 13, detachment member 252 may include a tool receiving feature 254 therein configured to receive a tool 268 (FIG. 15 only) such as but not limited to a pry bar, screwdriver, channel lock pliers, adjustable wrench. Tool receiving feature(s) 254 may have any size and/or shape to prevent coating 248 from filling it. In certain embodiments, as shown best in FIG. 14, in contrast to cover members 130, 140 in FIGS. 1-12, cover member 230 may also include a force receiving surface 270 at a distance D6 (FIG. 14 only) from detachment member 252. A force F (up or down) applied by tool 268 positioned in tool receiving feature 254 of detachment member 252 applies a lever force LF (clockwise or counterclockwise, respectively) to detach attachment ligament 220 from part 102. In any event, detachment member 252 is capable of manipulation to apply a force by a tool or manually that breaks attachment ligament 220, thus allowing removal of mask 200. Detachment member 252 may have any desired vertical height from cover member 230. As shown for example in FIG. 14, detachment member 252 may be positioned over proximal end 232 of cover member 230, or as shown for example in FIG. 15, it may be spaced between proximal end 232 and distal end 234 of cover member 230, e.g., closer to proximal end 232 to allow force to be applied more directly to attachment ligament 220 during removal.

Figure 17:
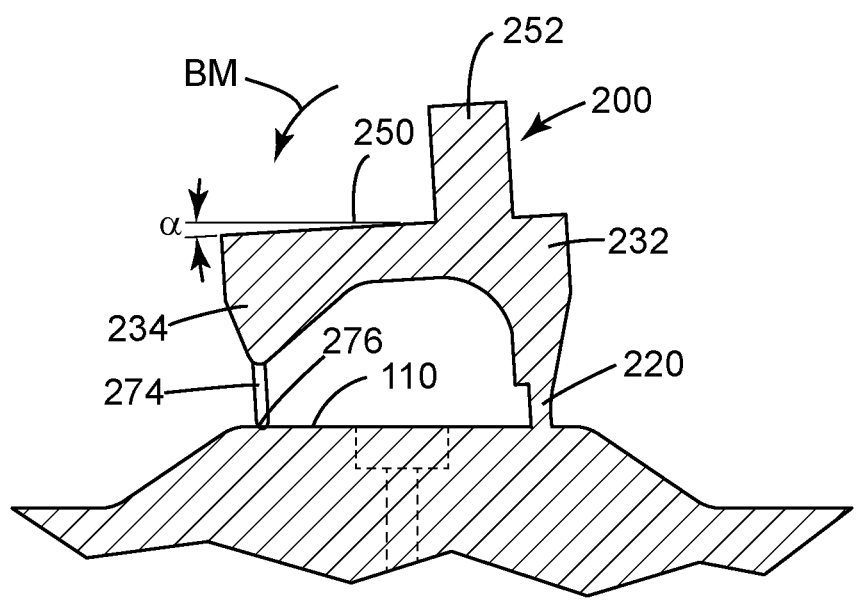
FIG. 17 shows an enlarged cross-sectional view of the mask of FIG. 13 in a flexed position, according to embodiments of the disclosure.
Figure 18:
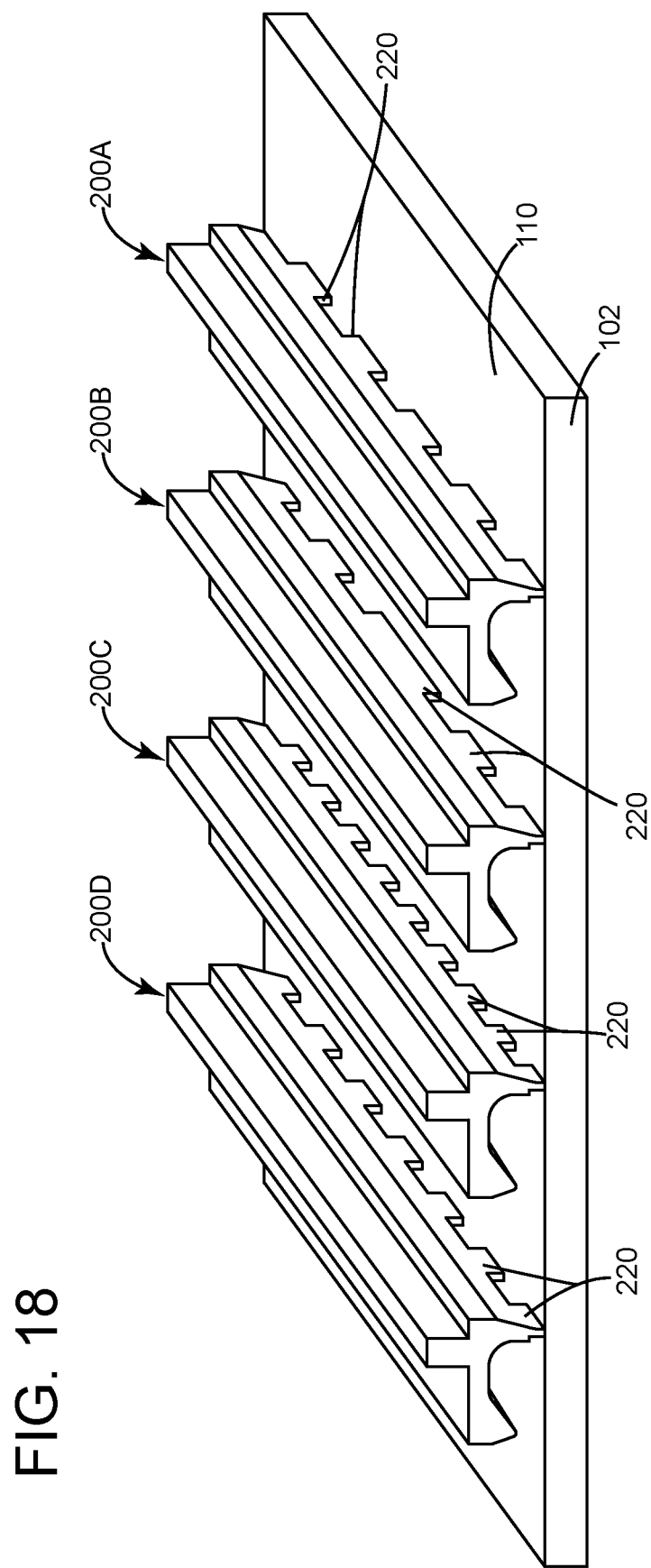
FIG. 18 shows a perspective view of a number of masks illustrating variations of attachment ligaments, according to embodiments of the disclosure.

As shown in FIG. 13 and the cross-section of FIG. 14, mask 200 may optionally include at least a pair of pivot restraint members 274 extending from distal end 234 of cover member 230. In FIG. 13, three pivot restraint members 274 are shown extending from distal ends 234 of each mask 200; however, any number may be used, including more than three. As shown in FIG. 14, each pivot restraint member 274 extends from distal end 234 to a spacing D7 from part 102, i.e., surface 110, in a first, relaxed position of cover member 230. That is, each pivot restraint member 274 may have its own distal end 276 spaced from part 110 by spacing D7. Spacing D7 between pivot restrain member 274 and part 102 is less than spacing D4 between distal end 234 of cover member 230 and part 102. In one non-limiting example, spacing D7 may be approximately 0.1 millimeters (mm) (0.004 inches). As shown in FIG. 17, due to the cantilevered nature of mask 200, under certain circumstances such as coating and/or peening processes, mask 200 may pivot. In this setting, pivot restraint member(s) 274 may move closer to and/or contact part 102 in a second, pivoted position in which a bending moment force BM (FIG. 17) is applied to at least one of attachment ligament 220, cover member 230 and detachment member 252. Pivot restraint member(s) 274 thus resists any temporary force applied during the processing that is not intended to remove mask 200. Once the bending moment BM force is removed, mask 200 may return to the relaxed position shown in, for example, FIG. 14, and spacing D7 returns between pivot restraint member(s) 274 and part 102. FIG. 16 shows mask 200 without pivot restraint members.

With further regard to attachment ligament 220, as shown in FIG. 14, attachment ligament 220 has a minimum width W3 that allows for its easy detachment, and thus mask 200 detachment, from part 102. FIG. 14 shows an attachment ligament 220 that meets at substantially perpendicular angle with part 102; other angles may be possible. Attachment ligament(s) 220 may taper or narrow to foster breaking. For example, in FIG. 14, attachment ligament 220 may have a lower portion 226 integrally coupled to part 102 having a first (minimum) width W3, and an upper portion 228 above lower portion 226 having a second width W4 that is wider than first width W3. Attachment ligament 220 may also have varying widths as described relative to FIGS. 5 and 6, or a generally uniform width as in FIG. 2. In one non-limiting example, attachment ligament(s) 220 may have a minimum width W3 ranging from 0.01 millimeters (mm) to 0.50 mm (0.01 to 0.02 inches). The minimum width W3 can vary depending on a large number of factors including but not limited to: part and mask material, size of part 102, size of openings 204, desired force to remove, expected tools to be used, an anticipated width Wcm (FIG. 14) of cover member 230, etc. Incidentally, cover member width Wcm of cover member 230 may be in one non-limiting example, 5.33 mm to 6.35 mm (0.21 to 0.25 inches).

Attachment ligament(s) 220 may also take a variety of structural forms. In certain embodiments, as shown in FIG. 13, attachment ligament 120 may extend an entire length of mask 200 that includes a single length of cover member 230. Alternatively, similar to that shown in various forms in FIG. 7, attachment ligaments 220 may integrally couple to part 102 at spaced connection points along the distance covered by cover member 230. Any configuration of spaced attachment ligaments 220 may be employed. In the non-limiting examples in FIG. 18: mask 200A has attachment ligaments 220 generally randomly spaced with varying lengths; mask 200B also has attachment ligaments 220 generally randomly spaced with varying lengths but differently spaced than mask 200A; mask 200C has attachment ligaments 220 equidistantly spaced with uniform lengths excepting an end attachment ligament 220E; and mask 200D has pairs attachment ligaments 220 equidistantly spaced with uniform lengths. In certain embodiments, attachment ligaments 220 integrally couple to part 102 along between 25% and 60% distance covered by cover member 230. In a further embodiment, attachment ligaments 220 integrally couple to part 102 along between 25% and 35% distance covered by cover member 230. Any desired attachment ligament 220 spacing and length can be employed to attain the desired detachment action, e.g., desired force, tool, etc., and desired attachment ligament 220 remnant on part 220 after mask 200 removal. Any remnants of attachment ligament(s) 220 may be removed through machining, e.g., grinding.

With further regard to cover member 230, as shown for example in FIG. 14, cover member 230 may include a pair of squared corners 280, 282. Squared corners 280, 282 are on opposing sides of attachment ligament 220. In this manner, when grasped by hand or by a tool such as pliers, mask 200 can be readily removed by breaking attachment ligament(s) 220.

FIGS. 19-25 show cross-sectional views of various alternative embodiments similar to mask 200. In these embodiments, as shown for example in FIG. 19, masks 300 include attachment ligament 220 and cover member 230. Proximal end 232 of cover member 230 couples to attachment ligament 220. Cover member 230 and distal end 234 thereof extend over openings 204 and distal end 234 has a spacing D8 from part 102, i.e., surface 110. Spacing D8 may be similar to spacing D4 (FIG. 14). Optional pivot restraint member(s) 274 may extend from distal end 234 in each embodiment, but may not be shown for clarity.

Figure 19:
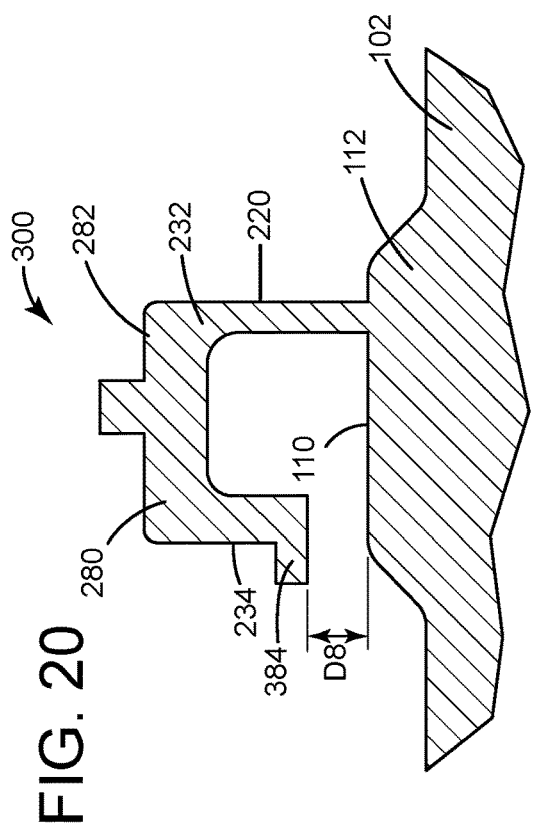
FIG. 19 shows a cross-sectional view of a mask including alternative features, according to embodiments of the disclosure.
Figure 20:
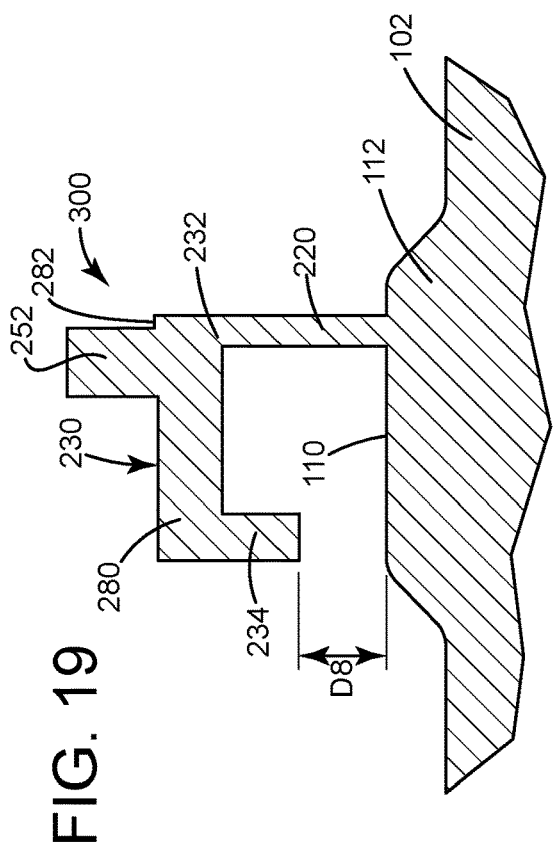
FIG. 20 shows a cross-sectional view of a mask including alternative features, according to embodiments of the disclosure.
Figure 21:
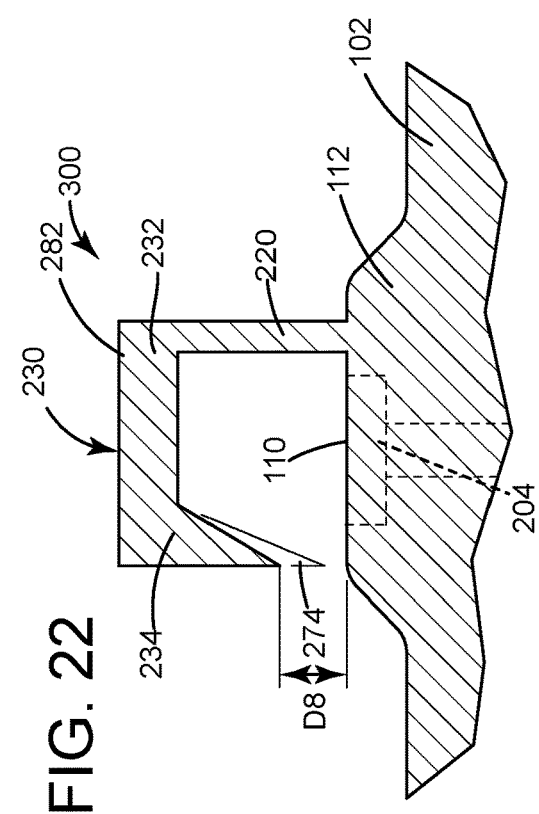
FIG. 21 shows a cross-sectional view of a mask including alternative features, according to embodiments of the disclosure.

FIGS. 19-21 show cross-sectional views of mask 300 similar to mask 200 (FIGS. 12-18) that include detachment member 252 and various alternative structures. FIG. 19 shows a mask 300 with a distal end 234 having a generally polygonal (e.g., rectangular) cross-sectional shape. FIG. 20 shows a mask 300 with a distal end 234 that includes a flange 384 extending away from attachment ligament 220. FIG. 21 shows a mask 300 similar to FIG. 20 but including a detachment member 352 spaced between proximal end 232 and distal end 234 of cover member 230, and including a cutout 386 to receive a tool (not shown).

Figure 22:
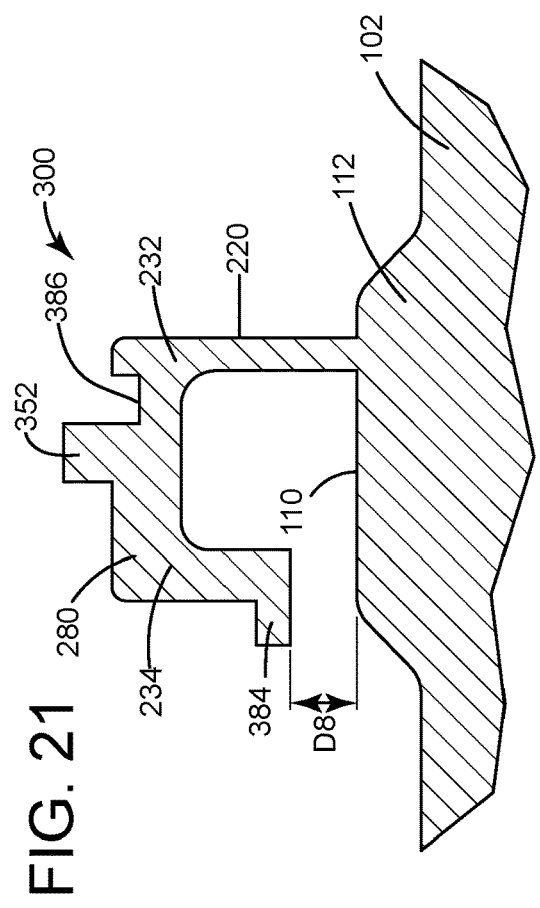
FIG. 22 shows a cross-sectional view of a mask including alternative features, according to embodiments of the disclosure.

FIG. 22-25 show cross-sectional views of mask 300 where detachment member 352 (FIGS. 19-21) has been omitted. FIG. 22 shows a mask 300 where detachment member 352 (FIGS. 19-21) has been omitted, and attachment ligament 220 is linear. FIG. 23 shows a mask 300 similar to FIG. 22 but including distal end 234 with flange 384 extending away from attachment ligament 220. FIGS. 24 and 25 show masks 300 in which squared corners 280, 282 (FIG. 22) are omitted. In FIG. 24, cover member 230 is rounded, and in FIG. 25, cover member 230 includes parallel sides 388, 390 for grasping by hand or by a tool (not shown), e.g., pliers. In FIG. 25, attachment ligament 220 has a lower portion 326 integrally coupled to part 102 having a first (minimum) width W5, and an upper portion 328 above lower portion 326 and having a second width W6 that is wider than first width W5. Distal end 234 in FIG. 25 has a pointed end 392.

Any of the alternative features shown in FIGS. 19-25 can be mixed and matched to create alternative embodiments within the scope of the disclosure.

Masks 200, 300 may be made of the same material as part 102. Mask 200, 300 and part 102 may be made of any of the materials listed herein for mask 100 and part 102. Mask 200, 300 and part 102 may be made of additive manufacturing, e.g., DMLM or SLM for a metal part, or 3D printing for a ceramic part. In this case, part 102, attachment ligament(s) 220, cover member 230 and detachment member 252 (and any alternative features described herein) will include a plurality of integral material layers.

While embodiments of the disclosure have been described with masks 100, 200, 300 as additively manufactured with part 102, it will be readily recognized that masks 100, 200, 300 could be separately formed by additive manufacture or other techniques and coupled to part 102, e.g., by welding.

Embodiments of the disclosure provide a mask for an additively manufactured part that provides protection of openings in the surface of the part during other processes such as coating and peening. The masks described herein can be additively manufactured with the part to eliminate the need for laboriously manually masking off the openings, e.g., with taping or weld-on structures. The masks also better protect the openings from processes that could damage them, e.g., peening, and eliminates the need for costly cleaning out of the openings.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate+/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A mask for an additively manufactured part, the part including a plurality of openings in a surface thereof, the mask comprising:
    an attachment ligament configured to integrally couple to the part adjacent to the plurality of openings in a cantilever fashion;
    a cover member including a proximal end integrally coupled to the attachment ligament and a distal end extending at least partially over the plurality of openings, the distal end of the cover member separated from the part by a first spacing, wherein the attachment ligament is the only connection from the cover member to the part; and a detachment member extending from the cover member.

2. The mask of claim 1, wherein the attachment ligament has a minimum width ranging from 0.01 millimeters (mm) to 0.50 mm.

3. The mask of claim 1, wherein the plurality of openings are positioned in the surface of the part across a distance, and wherein the cover member extends at least partially over the plurality of openings along an entirety of the distance.

4. The mask of claim 3, wherein the attachment ligament integrally couples to the part at spaced connection points along the distance.

5. The mask of claim 4, wherein the attachment ligament integrally couples to the part along between 25% and 60% of the distance.

6. The mask of claim 1, wherein the first spacing is between 0.88 millimeters (mm) to 1.4 mm (0.035 to 0.055 inches).

7. The mask of claim 1, wherein the first spacing has a dimension configured to prevent a coating applied over the cover member from bridging from the cover member to the part and prevent a peening material from passing therethrough.

8. The mask of claim 1, wherein the part, the attachment ligament, the cover member and the detachment member include a plurality of integral material layers.

9. The mask of claim 1, further comprising at least a pair of pivot restraint members extending from the distal end of the cover member, wherein each pivot restraint member has a distal end spaced from the part by a second spacing less than the first spacing in a first, relaxed position of the cover member and in contact with the part in a second position in which a bending moment force is applied to at least one of the attachment ligament, the cover member and the detachment member.

10. The mask of claim 9, wherein the second spacing is approximately 0.1 millimeters (mm).

11. The mask of claim 1, wherein the detachment member includes a tool receiving feature therein configured to receive a tool, and the cover member includes a force receiving surface at a distance from the detachment member, wherein a force applied by a tool positioned in the tool receiving feature of the detachment member applies a lever force to detach the attachment ligament from the part.

12. The mask of claim 1, wherein the cover member includes a pair of squared corners, the squared corners on opposing sides of the attachment ligament.

13. The mask of claim 1, wherein the attachment ligament includes a lower portion integrally coupled to the part and having a first width, and an upper portion above the lower portion and having a second width that is wider than the first width.

14. An additively manufactured (AM) structure, comprising:

a part including a plurality of openings in a surface thereof;

a mask including:

an attachment ligament configured to integrally couple to the part adjacent to the plurality of openings in a cantilever fashion;

a cover member including a proximal end integrally coupled to the attachment ligament and a distal end extending at least partially over the plurality of openings, the distal end of the cover member separated from the part by a first spacing; and a detachment member extending from the cover member, wherein the attachment ligament is the only connection from the cover member to the part, and wherein the part, the attachment ligament, the cover member and the detachment member include a plurality of integral material layers.

15. The AM structure of claim 14, wherein the plurality of openings are positioned in the surface of the part across a distance, and wherein the cover member extends at least partially over the plurality of openings along an entirety of the distance, and the attachment ligament integrally couples to the part at spaced connection points along the distance.

16. The AM structure of claim 14, wherein the first spacing has a dimension configured to prevent a coating applied over the cover member from bridging from the cover member to the part and prevent a peening material from passing therethrough.

17. The AM structure of claim 14, further comprising at least a pair of pivot restraint members extending from the distal end of the cover member, wherein each pivot restraint member has a distal end spaced from the part by a second spacing less than the first spacing in a first, relaxed position of the cover member and in contact with the part in a second position in which a bending moment force is applied to at least one of the attachment ligament, the cover member and the detachment member.

18. The AM structure of claim 14, wherein the detachment member includes a tool receiving feature therein configured to receive a tool, and the cover member includes a force receiving surface at a distance from the detachment member, wherein a force applied by a tool positioned in the tool receiving feature of the detachment member applies a lever force to detach the attachment ligament from the part.

* * * * *